United States Patent [19]

Tsuchida

[11] Patent Number: 4,735,464
[45] Date of Patent: Apr. 5, 1988

[54] BRAKE DEVICE FOR VEHICLES

[75] Inventor: Tetsuo Tsuchida, Saitama, Japan

[73] Assignee: Honda Giken Kogyo Kabushiki Kaisha, Tokyo, Japan

[21] Appl. No.: 899,479

[22] Filed: Aug. 22, 1986

[30] Foreign Application Priority Data

Aug. 23, 1985 [JP] Japan .................. 60-185207

[51] Int. Cl.⁴ .......................... B60T 8/42; B60T 8/34; B60T 11/00
[52] U.S. Cl. ................................ 303/113; 303/116; 188/181 A; 188/344
[58] Field of Search ............. 303/113, 115, 116, 24 R, 303/24 C; 188/181 A, 181 R, 344

[56] References Cited

U.S. PATENT DOCUMENTS

| | | | |
|---|---|---|---|
| 2,329,249 | 9/1943 | Carlson | 280/276 |
| 2,818,244 | 12/1957 | Ropar | 264/1 |
| 2,920,924 | 1/1960 | Reswick et al. | 303/24 |
| 2,954,237 | 9/1960 | Sampietro | 280/703 |
| 3,046,060 | 7/1982 | Stager et al. | 303/99 |
| 3,352,388 | 11/1967 | Leiber | 303/24 R |
| 3,403,761 | 10/1968 | Rockwell | 188/265 |
| 3,537,715 | 11/1970 | Gualdoni | 280/703 X |
| 3,542,145 | 11/1970 | Proffer | 180/219 |
| 3,556,613 | 1/1971 | Keller | 188/181 R |
| 3,655,016 | 4/1972 | Watanabe | 188/2 A X |
| 3,667,816 | 6/1972 | Harned | 303/21 |
| 3,731,767 | 5/1973 | Lefort | 188/72.2 |
| 3,829,166 | 8/1974 | von Loewis et al. | 303/21 CG |
| 3,908,805 | 9/1975 | Morse et al. | 188/181 A |
| 3,989,261 | 11/1976 | Kawaguchi | 188/272 X |
| 4,036,331 | 7/1977 | Hayashi et al. | 188/187 |
| 4,046,427 | 9/1977 | Baynes et al. | 303/115 |
| 4,050,748 | 9/1977 | Belart | 303/114 |
| 4,061,212 | 12/1977 | Blomberg | 188/180 |
| 4,114,460 | 9/1978 | Oto | 74/18.2 |
| 4,159,123 | 6/1979 | Petty | 188/272 X |
| 4,225,019 | 9/1980 | Blomberg | 188/181 R |
| 4,239,294 | 12/1980 | Burgdorf | 188/344 |
| 4,260,201 | 4/1981 | Farr | 188/181 A |
| 4,274,518 | 6/1981 | Berisch | 188/344 |
| 4,281,881 | 8/1981 | Mekosh et al. | 303/99 |
| 4,289,359 | 9/1981 | Lüpertz et al. | 188/344 |

(List continued on next page.)

FOREIGN PATENT DOCUMENTS

| | | |
|---|---|---|
| 0495146 | 8/1953 | Canada . |
| 55-14295 | 4/1980 | Japan . |
| 55-45421 | 11/1980 | Japan . |
| 57-33052 | 2/1982 | Japan . |
| 676708 | 7/1952 | United Kingdom . |
| 778765 | 7/1957 | United Kingdom . |
| 894577 | 4/1962 | United Kingdom . |
| 895294 | 5/1962 | United Kingdom . |

List continued on next page.

OTHER PUBLICATIONS

SAE Technical Series 830404, "Performance of Antilock Brakes with Simplified Control Technique", Satoh and Shiraishi, 1983.
SAE Section 5: Technical Sessions, pp. 903–909, "Performance of a Simplified Control Technique for Antilock Brakes", Satoh and Shiraishi, 1983.

Primary Examiner—Andres Kashnikow
Assistant Examiner—Timothy Newholm
Attorney, Agent, or Firm—Lyon & Lyon

[57] ABSTRACT

A brake device provided with an antilock controller which includes a sensor for sensing by the overrunning of a flywheel an abrupt deceleration of a wheel of the vehicle resulting from the braking action of a brake device, a modulator for controlling a braking pressure fed to the brake device in accordance with a signal from the sensor and a hydraulic pump driven by the wheel. The sensor and a transmission device are adapted to operatively connect the flywheel of the sensor to the wheel are housed in a closed chamber defined between a pair of hub end walls which are supported on an axle through bearings, and the flywheel is supported on the axle. The hydraulic pump, the modulator and a transmission device operatively connecting the hydraulic pump to the wheel are arranged externally of the closed chamber.

9 Claims, 4 Drawing Sheets

U.S. PATENT DOCUMENTS

| | | | |
|---|---|---|---|
| 4,336,859 | 6/1982 | Leitner | 180/226 |
| 4,340,258 | 7/1982 | Farr | 303/115 |
| 4,350,396 | 9/1982 | Mortimer | 303/115 |
| 4,353,440 | 10/1982 | Farr | 188/181 A |
| 4,354,715 | 10/1982 | Farr et al. | 303/116 |
| 4,355,849 | 10/1982 | Wilson | 303/116 |
| 4,365,538 | 12/1982 | Andoh | 91/1 |
| 4,377,221 | 3/1983 | Farr | 188/181 A |
| 4,381,049 | 4/1983 | Crossman | 188/72.7 |
| 4,381,125 | 4/1983 | Wilson | 303/116 |
| 4,387,934 | 6/1983 | Farr | 303/115 |
| 4,401,348 | 8/1983 | Farr | 303/116 |
| 4,405,006 | 9/1983 | Preuskar | 152/170 |
| 4,405,181 | 9/1983 | Resch et al. | 303/9 |
| 4,408,673 | 10/1983 | Leiber | 180/141 |
| 4,414,630 | 11/1983 | Harris et al. | 364/426 |
| 4,416,353 | 11/1983 | Ivanov | 188/2 A |
| 4,421,359 | 12/1983 | Hayashi et al. | 303/6 A |
| 4,422,695 | 12/1983 | Farr | 303/115 |
| 4,428,624 | 1/1984 | Farr | 303/116 |
| 4,437,678 | 3/1984 | Schultz | 280/703 X |
| 4,445,585 | 5/1984 | Imani | 180/219 |
| 4,456,309 | 6/1984 | Rath | 303/10 |
| 4,456,310 | 6/1984 | Hayashi et al. | 303/119 |
| 4,457,563 | 7/1984 | Farr | 303/92 |
| 4,465,322 | 8/1984 | Hayashi | 303/6 A |
| 4,474,413 | 10/1984 | Farr | 303/116 |
| 4,475,774 | 10/1984 | Davis | 303/112 |
| 4,492,284 | 1/1985 | Hayashi | 180/219 |
| 4,494,800 | 1/1985 | Hayashi | 303/6 A |
| 4,515,384 | 5/1985 | Honma et al. | 280/276 |
| 4,552,373 | 11/1985 | Kawaguchi et al. | 280/703 X |
| 4,564,244 | 1/1986 | Reinartz et al. | 303/6 C |
| 4,572,317 | 2/1986 | Isono et al. | 180/227 |
| 4,602,705 | 7/1986 | Farr | 188/181 A |
| 4,660,683 | 4/1987 | Tsuchida et al. | 188/181 A |
| 4,664,233 | 5/1987 | Tsuchida et al. | 303/115 X |
| 4,673,221 | 6/1987 | Hayashi et al. | 303/115 X |
| 4,694,938 | 9/1987 | Hayashi et al. | 188/181 A |
| 4,697,825 | 10/1987 | Hayashi et al. | 280/703 |

FOREIGN PATENT DOCUMENTS

| | | | |
|---|---|---|---|
| 1121561 | 7/1968 | United Kingdom | |
| 1142500 | 2/1969 | United Kingdom | |
| 1159592 | 7/1969 | United Kingdom | |
| 1252674 | 11/1971 | United Kingdom | |
| 1376042 | 12/1974 | United Kingdom | |
| 1496721 | 12/1977 | United Kingdom | |
| 2069639 | 2/1981 | United Kingdom | 303/116 |
| 2069641 | 2/1981 | United Kingdom | |
| 2069642 | 8/1981 | United Kingdom | 188/181 A |
| 2069641A | 8/1981 | United Kingdom | |
| 2070166A | 9/1981 | United Kingdom | |
| 2109494 | 6/1983 | United Kingdom | |
| 2120336 | 11/1983 | United Kingdom | |

BRAKE DEVICE FOR VEHICLES

BACKGROUND OF THE INVENTION

1. Field of the Invention

The present invention relates to brake devices for vehicles such as motorcycles and automobiles, and more particularly to an improvement in a brake device comprising a sensor having a flywheel driven by a wheel through a transmission system, said sensor sensing the state of the wheel being about to lock by the overrunning rotation of the flywheel, when the wheel is braked by a wbeel brake, to generate an output signal; a hydraulic pump driven by the wheel through the transmission system; a modulator having a hydraulic control chamber communicated with an outlet chamber of the pump and interposed in a brake oil passage between a master cylinder and the wheel brake to decrease and restore the braking hydraulic pressure of the wheel brake in response to a decrease and increase in pressure of the hydraulic control chamber; and a normally closed exhaust pressure valve interposed in a communicating passage between the hydraulic control chamber and an oil reservoir, the valve being opened upon receipt of an output signal from the sensor.

2. Description of the Prior Art 1. DESCRIPTION OF THE PRIOR ART

Such a brake device as described above has already been known as disclosed, for example, in Japanese Patent Application Laid-Open No. 120,440/1981. In this conventional device, The entire antilock controller is mounted on a supporting system for wheels externally of the wheels.

The prior art has disadvantages to bring forth a large sized structure around the wheels and an increase in weight because a large installing space has to be secured externally of the wheels for the antilock controller and because a special supporting construction has to be provided for rigidly supporting the antilock controller on the supporting system for an axle, and the like.

SUMMARY OF THE INVENTION

It is an object of the present invention to provide a brake device of the mentioned type which overcomes these disadvantages noted above.

For achieving the above-described object, according to a first aspect of the present invention, there is provided a brake device wherein a hub of a wheel is formed with a pair of left and right end walls to define a closed chamber therebetween, both the end walls are respectively supported via bearings on an axle extending therethrough, at least a sensor and a first transmission device adapted to operatively connect a flywheel of the sensor to the hub are housed in the closed chamber, and the flywbeel is supported on the axle.

According to a second aspect of the present invention, there is provided, in addition to the aforementioned first aspect, an arrangement wherein the antilock controller is divided into a mechanical operating section comprising a sensor and a first transmission device for operatively connecting a flywheel of the sensor to a wheel, and a hydraulically operating section comprising a hydraulic pump, a second transmission device for operatively connecting the pump to the wheel, a modulator and an exhaust pressure valve, the mechanical operating section being housed in the closed chamber with the flywheel being supported on the axle, the hydraulically operating section being mounted on a supporting system for the wheel externally of the wheel.

With the aforementioned first aspect, the closed chamber within the hub of tbe wheel constitutes a space for installation of at least the sensor and the first transmission device for driving the sensor of the antilock controller, and the axle constitutes a supporting member for the sensor. Accordingly, the provision of any installing space for the sensor externally of the wheel as well as the provision of a cover for protecting the sensor from external disturbances such as rain water, mud and sand, etc. can be eliminated. In addition, the supporting construction for the sensor is simplified to achieve a miniaturization and lightweightness of the antilock controller, thus minimizing the protrusion of the antilock controller to the outside of the wheel, to miniaturize parts around the wheel.

Moreover, the hub has a pair of left and right end walls for defining a closed chamber and both the end walls are supported on the axle through the bearings. Therefore. a wide supporting space for the hub is achieved irrespective of the presence of the sensor and the like.

Furthermore, with the second aspect of the present invention, despite the fact that the mechanical operating section of the antilock controller is housed in the hub of the wheel, piping to provide connections between the hydraulically operating section and the master cylinder and wheel brake which are disposed outside the wheel may be easily carried out, thus facilitating the maintenance work.

The above, and other objects, features and advantages will become apparent from the ensuing description of the preferred embodiments in connection with the accompanying drawings.

DETAILED DESCRIPTION OF THE PREFERRED EMBODIMENTS

One embodiment of the present invention will be described with specific reference to the accompanying drawings.

Figure 1:
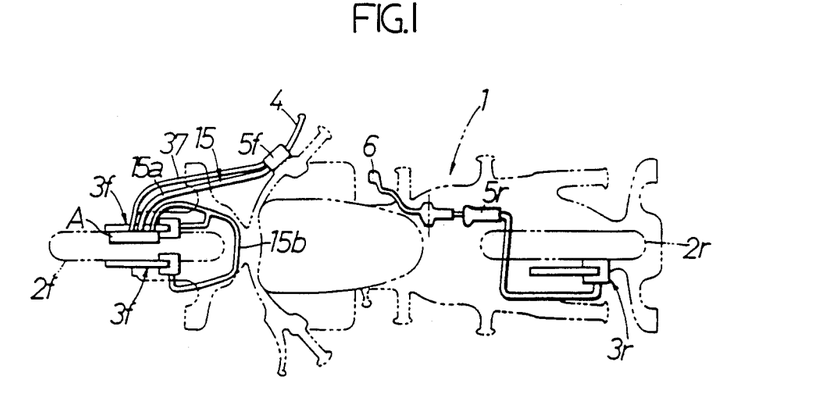
FIG. 1 is a schematic plan view of a motorcycle provided with a brake device with an antilock brake device.

Looking first to tbe embodiment of FIG. 1, a motorcycle 1 has a pair of front right and left wheel brakes 3f for braking a steering front wheel 2f and a single rear wheel brake 3r for braking a rear wheel 2r. The front brakes 3f are operated by the output of hydraulic pressure from a front master cylinder 5f operated by a brake lever 4. The rear brake 3r is operated by the output of hydraulic pressure from a rear master cylinder 5r which is actuated by a brake pedal 6. Particularly, the hydraulic pressure to the front brakes 3f are controlled by an antilock controller A.

Figure 2:
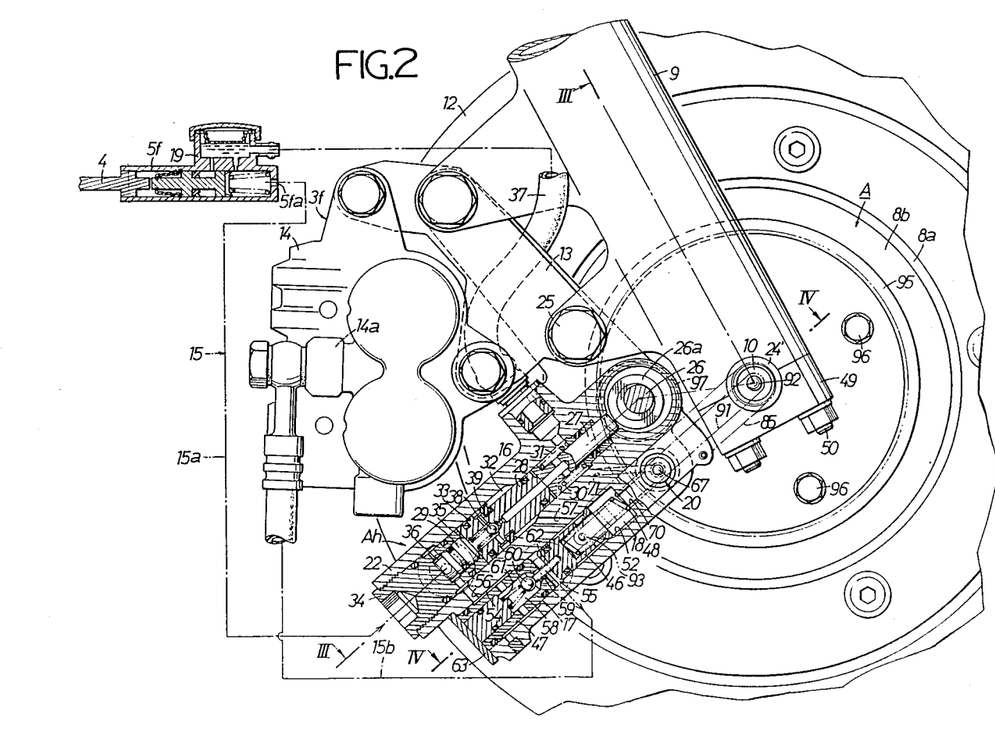
FIG. 2 is a side elevation of the brake device with its essential portion in section.
Figure 3:
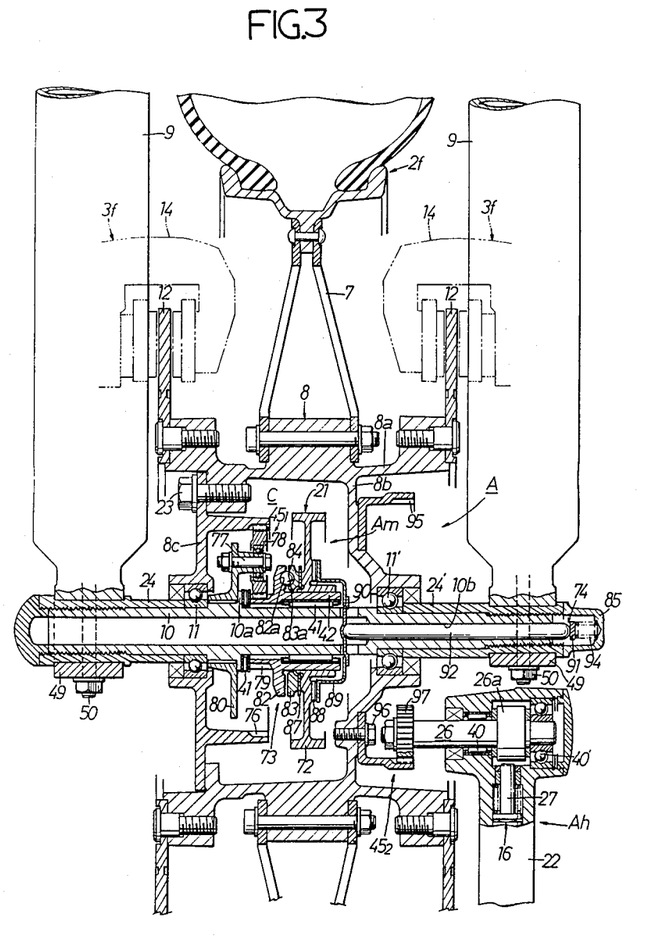
FIGS. 3 and 4 are sectional views taken along line III—III and IV—IV, respectively, of FIG. 2.

Turning to FIGS. 2 and 3, a hub 8 of the front wheel 2f is composed of a cylindrical shell 8a connected to a spoke 7, a first end wall 8b connected integral with an inner peripheral wall of the shell 8a so as to close one end thereof, and a second end wall 8c detachably secured by means of a bolt 23 to the shell 8a so as to close the other end of the shell 8a. The end walls 8b, 8c are supported through bearings 11, 11' on an axle 10 which extend through the center of the end walls 8b, 8c. A closed chamber C to which the center of the axle 10 faces is defined between both the end walls 8b, 8c.

A pair of set collars 24, 24' are screwed in the outer peripheries of both ends of the axle 10 so as to sandwich the bearings 11, 11' therebetween. Both the ends of the axle 10 are held through the set collars 24, 24' on the lower ends of a pair of left and right front forks 9, 9 by holders 49, 49 and bolt and nuts 50, 50.

Each of the brakes 3f disposed on both sides of the front wheel 2f includes a brake disc 12 securely fixed to the end face of the shell 8a of the hub 8 and a brake caliper 14 straddling the disc 12 and supported by a bracket 13 to the front fork 9. The caliper 14 operates to grip the brake disc 12 when the output of hydraulic pressure from the cylinder 5f is supplied to the input port 14a. In this way, a braking force is applied to the wheel 2f.

The antilock controller A is interposed in the hydraulic conduit 15 as a braking oil passage coupled between the output port 5fa of the master cylinder 5f and the input port 14a of the caliper 14.

The antilock controller A is divided into a mechanical operating section Am and a hydraulic pressure operating section Ah, the section Am being disposed in the closed chamber C of the hub 8, and the section Ah being disposed externally of the hub 8. For encasing the mechanical operating section Am into the closed chamber C, the second end wall 8c is removed from the shell 8b of the hub 8.

The mechanical operating section Am is composed of a first transmission device $45_1$ and a sensor 21 which is driven with speed increased from the front wheel 2f through the first transmission device $45_1$ to sense an angular deceleration above a fixed value of the front wheel 2f. The hydraulic pressure operating section Ah is composed of a second transmission device $45_2$, a hydraulic pressure pump 16 driven by the front wheel 2f through the second transmission device $45_2$, a modulator 17 having a hydraulic control chamber 18 to receive the discharge pressure of the pump 16 and interposed in the midst of the conduit 15 and an exhaust pressure valve 20 interposed in a passage between the chamber 18 and a reservoir 19 and adapted to be opened upon receipt of the output signal of the sensor 21.

The above-described elements will be further described in detail.

First, in the mechanical operating section Am, the first transmission device $45_1$ is composed of a ring gear 76 projected integral with the inner surface of the second end wall 8c, a planetary gear 78 rotatably supported at 77 on a stationary supporting plate 80 spline-coupled to the axle 10 and meshed with the ring gear 76, and an output shaft 42 having a sun gear 79 meshed with the planetary gear 78 and supported on the axle 10 through a bearing 41, whereby the rotation of the front wheel 2f is increased in speed to transmit it to the output shaft 42.

The sensor 21 has a flywheel 72 rotatably and slidably supported on the output shaft 42, and the rotation of the output shaft 42 is transmitted to the flywheel 72 through a cam mechanism 73 and a frictional clutch plate 87.

The cam mechanism 73 is composed of a driving cam plate 82 fixedly secured to the output shaft 42, a driven cam plate 83 opposedly disposed relatively rotatably on the driving cam plate 82 on the output shaft 42, and a thrust ball 84 engaged in cam recesses 82a, 83a on the surface opposed to the cam plates 82, 83. The friction clutch plate 87 is interposed between the opposed surfaces of the driven cam plate 83 and the flywheel 72. In the normal case where the driving cam plate 82 takes a place of the driving side relative to the driven cam plate 83, the thrust ball 84 remains engaged in the deepest portion of the cam recesses 82a, 83a, and the rotational torque received by the driving cam plate 82 from the output shaft 42 is merely transmitted to the driven cam plate 83 thus rotating the flywheel 72, which causes both the cam plates 82, 83 not to provide relative rotation. Next, when the place is reversed, namely, when the driven cam plate 83 overruns with respect to the driving cam plate 82, the cam plates relatively rotate and the thrust ball 84 rolls in a manner as to climb along the inclined bottom surfaces of the cam recesses 82a and 83a to apply a thrust to the cam plates 82 and 83, whereby causing the driven cam plate 83 to be axially displaced in a direction away from the driving cam plate 82, thus axially sliding the flywheel 72. In this case, the driving cam plate 82 is supported on a flange 10a of the axle 10 through a thrust bearing 41 so that the cam plate 82 may not be displaced axially.

A pressing plate 89 is mounted through a thrust bearing 88 on the side, of the flywheel 72, opposite the friction clutch 87, the pressing plate 89 being connected to the hydraulic pressure operating section Ah through a signal transmission mechanism 74 which will be described later.

Next, in the hydrualic pressure operating section Ah, the second transmission device $45_2$ is composed of a ring gear 95 fixedly secured by bolt 96 to the outer surface of the first end 8b of the hub 8, a pinion 97 meshed with the ring gear 95, and a pump shaft 26 fixedly secured to the end of the pinion 97. The rotation of the front wheel 2f is increased in speed to transmit it to the pump shaft 26.

The pump shaft 26 is supported on the casing 22 through a pair of left and right bearings 40, 40', the casing 22 being fixedly secured by bolt 25 to the front fork 9 along with the bracket 13 of the front wheel brake 3f.

The hydraulic pump 16 is composed of an eccentric cam 26a formed on the pump shaft 26 between the bearings 40 and 40', a push rod 27 disposed with the inner end thereof opposed to the eccentric cam 26a, a pump piston 28 in abutment against the outer end of the push rod 27, an operating piston 29 in abutment against the outer end of the pump piston 28 and a return spring 30 for urging the push rod 27 in a direction away from the eccentric cam 26a.

The push rod 27 and pump piston 28 are slidably fitted in a first cylinder bore 33 formed in the casing 22 so as to define an inlet chamber 31 and an outlet chamber 32 in their outer peripheries, respectively. A plug 34 is fixed to the outer end of the first cylinder bore 33 so as to define a pump chamber 35 adjacent the pump piston 28, and the operating piston 29 is slidably fitted in the plug 34 so as to define a hydraulic chamber 36.

The inlet chamber 31 is in communication with the reservoir 19 through the conduit 37 and communicated with the pump chamber 35 through a suction valve 38. The pump chamber 35 is in communication with the outlet chamber 32 through a unidirectional seal member 39 having a discharge valve function. The bydraulic chamber 36 is connected to an upstream pipe 15a of the hydraulic conduit 15 so that the chamber 36 may always communicate with the output pump 5fa of the master cylinder 5f.

The modulator 17 is composed of a pressure reducing piston 46, a fixed piston 47 which receives one end of the pressure reducing piston 46 to define a limit of the rearward movement thereof, and a return spring 48 for urging the piston 46 in a direction of abutment with the fixed piston 47. The pistons 46 and 47 are slidably fitted in a second cylinder bore 52 formed adjacent to the first cylinder bore 33 in the casing 22.

In the second cylinder bore 52, the piston 46 defines a hydraulic control chamber 18 relative to the inner end wall of the second cylinder bore 52 and defines an output hydraulic chamber 55 relative to the fixed piston 47. The fixed piston 47 defines an inlet hydraulic chamber 54 in the outer periphery thereof. This input hydraulic chamber 54 is in communication with the chamber 36 of the pump 16 through the passage 56, the output hydraulic chamber 55 is connected to the downstream pipe 15a of the conduit 15 so that the chamber 55 may always communicate with the inlet port 14a of the front wheel brakes 3f, 3f, and the chamber 18 is in communication with the outlet chamber 32 of the pump 16 through the passage 57.

The fixed piston 47 comprises a valve chamber 58 always in communication with the input hydraulic chamber 54 and a valve port 59 to communicate the valve chamber 58 with the output hydraulic chamber 55. The valve chamber 58 encases therein a valve body 60 capable of opening and closing the valve port 59 and a valve spring 61 for urging the valve body 60 toward the closing side. A valve stem 62 for opening the valve body 60 is projected from one end face of the piston 46. The valve stem 62 maintains the valve body 6 in the open state when the piston 46 is positioned at its retraction limit.

An outward opening of the second cylinder bore 52 is closed by an end plate 63 fixedly secured to the casing 22. The fixed piston 47 is always held in a position in abutment with the end plate 63 by the force of the return spring 48 or by the hydraulic pressure introduced into the output hydraulic chambers 54 and 55.

The pressure exhaust valve 20 is composed of a valve seat member 65 fitted in a stepped cylinder bore 64 of the casing 22 and a valve body 67 slidably fitted in the valve seat member 65 to open and close the valve port 66. The valve seat member 65 defines an inlet chamber 68 in a small diameter portion of the stepped cylinder bore 54 and defines an outlet chamber 69 in a large diameter portion thereof. Both the chambers 68 and 69 are in communication with each other through the valve port 66. The inlet chamber 68 is in communication with the hydraulic control chamber 18 of the modulator 17 through the passage 70, and the outlet chamber 69 is is in communication with the inlet chamber 31 of the hydraulic pump 16 through the passage 71. After all, the outlet chamber 69 is to communicate with the reservoir 19.

Figure 4:
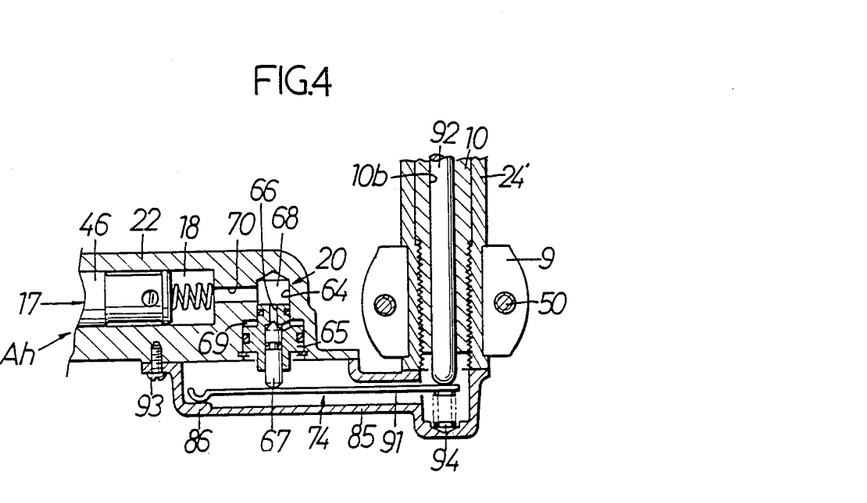

This valve 20 is connected to the pressing plate 89 of the sensor 21 through a signal transmission mechanism 74. As shown in FIGS. 3 and 4, the mechanism 74 is composed of a connecting plate 90 which laterally extends through the axle 10 and is axially movable along with the pressing plate 89, a push rod 92 slidably fitted in the center bore 10b of the axle 10 and having one end placed in abutment against the plate 90 and the other end projected on the side end of the hydraulic operating section Ah of the axle 10, a lever 91 having the foremost end placed in abutment against tbe push rod 92 and having the base end thereof carried on a support point 86 provided on cover 85 and a return spring 94 for urging the foremost end of the lever 91 toward the push rod 92. The lever 91 has its intermediate portion brought into engagement with the outer end of the valve body 67 so that the valve body 67 of the valve 20 is closed by the action of the spring 94.

The resilient force of the return spring 94 acts on the pressing plate 89 of the sensor 21 to apply a predetermined frictional engaging force to three elements, i.e., the flywheel 72, the friction clutch plate 87 and the driven cam plate 83 thus applying an access force to both the cam plates 82 and 83. The aforesaid frictional engaging force is set so as to produce a slip in the friction clutch plate 87 when a rotational torque in excess of a predetermined value acts between the cam plate 83 and the flywheel 72.

The cover 85 is disposed over and between the set collar 24' and the casing 22 and is fixedly secured to the casing 22 by means of screw 93.

The operation of the above-described embodiment will be described hereinafter.

When the vehicle is running, the rotation of the hub 8 of the front wheel 2f is increased in speed by the first transmission device $45_1$ and transmitted to the output shaft 42, and transmitted to the flywheel 72 through the cam mechanism 73 and the friction clutch 87 to drive the flywheel 72. Therefore the flywheel 72 is rotated at a speed higher than that of the front wheel 2f. Accordingly, the flywheel 72 may have a great rotational inertia force.

The rotation of the hub 8 is increased in speed by the second transmission device $45_2$ and transmitted also to the pump shaft 26 to rotate the eccentric cam 26a at a high speed.

If the master cylinder 5f is operated to brake the front wheel 2f, the output hydraulic pressure thereof is transmitted to the front brakes 3f through the upstream pipe 15a of the conduit, the hydraulic chamber 36 of the hydraulic pump 16, the input hydraulic chamber 54 of the modulator 17, the valve chamber 58, the valve port 59, the output hydraulic chamber 55 and the downstream pipe 15b of the conduit 15 to actuate them to apply the braking force to the front wheel 2f.

On the other hand, in the hydraulic pump 16, since the output hydraulic pressure of the master cylinder 5f is introduced into the chamber 36, the pressing action of the hydraulic pressure on the operating piston 29 and the lifting action of the eccentric cam 26a on the push rod 27 cause the reciprocation of the pump piston 28. In the suction stroke wherein the piston is moved toward the push rod 27, the suction valve 38 is opened, whereby the oil of the reservoir 19 is sucked from the conduit 37 to the pump chamber 35 through the inlet chamber 31. In the discharge stroke wherein the piston 28 is moved toward the operating piston 29, the unidirectional seal member 39 operates to open the valve whereby the oil of the pump chamber 35 is fed to the outlet chamber 32 and thence fed to the chamber 18 of the modulator 17 through the passage 57. When the pressure of the outlet chamber 32 and chamber 18 increases up to a predetermined value, the piston 28 is held at a position in abutment with the plug 34 due to pressure of the outlet chamber 32.

Since the hydraulic pressure control chamber 18 of the modulator 17 is initially interrupted from communication with the reservoir 19 by the closure of the exhaust pressure valve 20, the hydraulic pressure supplied from the pump 16 to the chambner 18 directly acts on the piston 46 to urge it against the retracted position, and the valve body 60 is maintained in an open state by the valve stem 62 to allow tha passage of the output hydraulic pressure of the cylinder 5f.

Accordingly, in the early stage of the braking, the braking force applied to the front wheel brakes 3f is proportional to the output hydraulic pressure of the master cylinder 5f.

As the angular deceleration of the front wheel 2f occurs with said braking, the flywheel 72 which has sensed it tends to effect overrunning rotation with respect to the output shaft 42 due to the inertial force thereof. The angular moment of the flywheel 72 at that time causes a relative rotation of the cam plates 82, 83 whereby the flywheel 72 is axially displaced by the thrust generated by the rolling of the thrust ball 84 to urge and move the lever 91 toward the pressing plate 89 through the push rod 92. However, in the stage where the front wheel 2f is not possibly locked, the angular deceleration of the front wheel 2f is so low not to pivot the lever 91.

However, when the front wheel 2f is about to lock due to the excessively great braking force or the lowering of the coefficient of friction of the road surface, the angular deceleration of the front wheel 2f rapidly increases, and the pressing force of the pressing plate 89 exceeds a predetermined value. The lever 91 swings so as to compress the return spring 94 and is moved away from the valve body 67, as a consequence of which the exhaust pressure valve 20 is open.

When the valve 20 is opened, the hydraulic pressure of the hydraulic control chamber 18 is discharged to the reservoir 19 through the passage 70, inlet chamber 68, valve port 66, outlet chamber 69, passage 71, inlet chamber 31 of the hydraulic pump 16 and conduit 37. With this, the pressure reducing piston 46 is moved toward the chamber 18 against the force of the return spring 48 due to the hydraulic pressure of the chamber 55, whereby the valve stem 62 is withdrawn to close the valve body 60, interrupt communication between the output hydraulic chambers 54 and 55 and increase the volume of the chamber 55. As a result, the braking hydraulic pressure acting on the front wheel brakes 3f lowers and the braking force of the front wheel 2f decreases to avoid the locking phenomenon of the front wheel 2f. Then, the pressing force of the pressing plate 89 against the lever 91 is released as the rotation of the front wheel 2f accelerates. Therefore, the lever 91 is returned to its initial position by the repulsion of the return spring 94 to render the valve 20 closed. When the valve 20 is closed, the hydraulic pressure oil discharged from the pump 16 is immediately confined within the chamber 18, and the piston 46 is moved back toward the chamber 55 to increase the pressure in the chamber 55, thus restoring the braking force. Such an operation is repeated at a high speed to thereby brake the front wheel 2f efficiently.

The sensor 21 of the antilock control device A and the first transmission device $45_1$ for driving the sensor 21 are encased in the closed chamber C formed in the hub 8 of the front wheel 2f, and the flywheel 72 of the sensor 21 is supported on the axle 10. Therefore, the specific provision of the installing space for the sensor 21 and the first transmission device $45_1$ externally of the front wheel 2f as well as the provision of the cover for protecting the sensor 21 from external disturbances such as rain water, earth and sand, etc. may be eliminated. In addition, the supporting construction of the sensor 21 may be simplified.

Furthermore, the hub 8 has a pair of a first and a second end walls which define the closed chamber C, which are supported on the axle 10 through the bearings 11, 11'. Therefore, the spacing between the bearings 11 and 11', namely, the suporting gap of the hub 8 may be provided widely without any interference of the sensor 21 or the like.

Moreover, the antilock control device A is divided into the mechanical operating section Am including the sensor 21 and the like and the hydraulic pressure operating section Ah including the modulator 17 and the like, the mechanical operating section Am being disposed within the hub 8 and the hydraulic operating section Ah disposed externally of the hub 8 as described above. Therefore, it is possible to easily carry out pipings to provide connections between tbe section Ah and the master cylinder 5f and front wheels 3f while protecting the section Am by the hub 8 from the external disturbances.

What is claimed is:

1. A brake device for a vehicle provided with an antilock controller which comprises a sensor having a flywheel driven by a wheel through a transmission system, said sensor sensing a state of the wheel being about to lock by an overrunning rotation of the flywheel, during braking by a wheel brake, to generate an output signal; a hydraulic pressure pump driven by the wheel through the transmission system; a modulator having a hydraulic control chamber in communication with an outlet chamber of the pump and interposed in a brake oil passage between a master cylinder and the wheel brake to decrease and restore a braking hydraulic pressure of the wheel brake in response to a decrease and increase in pressure of the hydraulic control chamber; and a normally closed exhaust pressure valve interposed in a communicating passage beteen the hydraulic control chamber and an oil reservoir, the valve being opened upon receipt of an output signal from the sensor, wherein a hub of the wheel is formed with a pair of left and right end walls to define a closed chamber therebetween, both said end walls being supported through bearings on an axle which extends through the end walls, at least said sensor and a first transmission device of the transmission system which is adapted to operatively connect the flywheel of the sensor to said hub are housed in said closed chamber, and the flywheel is supported on said axle, said first transmission device having a ring gear secured to one of said pair of end walls, the transmission system having another ring gear secured to the other end wall which drives said hydraulic pump.

2. The brake device according to claim 1 wherein said first transmission device comprises a ring gear formed integral with one of said end walls, a planetary gear secured to said axle and meshed with said ring gear, and a sun gear rotatably supported on said axle and meshed with said planetary gear.

3. The brake device according to claim 1 wherein said hub has a cylindrical shell portion, one of said pair of end walls is connected integral with said shell portion whereas the other is detachably secured to the shell portion.

4. The brake device according to claim 1 wherein said exhaust pressure valve is arranged externally of said closed chamber, a push rod is axially slidably fitted in said axle, the flywheel of said sensor is operatively connected to an axial inner end of said push rod, and said exhaust pressure valve is operatively connected to an axial outer end of said push rod.

5. A brake device for a vehicle provided with an antilock controler which comprises a sensor having a flywheel driven by a wheel through a transmission system, said sensor sensing a state of the wheel being about to lock by an overrunning rotation of the flywheel, during braking by a wheel brake, to generate an output signal; a hydraulic presure pump driven by the wheel through the transmission system; a modulator having a hydraulic control chamber in communication with an outlet chamber of the pump and interposed in a brake oil passage between a master cylinder and the wheel brake to decrease and restore a braking hydraulic pressure of the wheel brake in response to a decrease and increase in pressure of the hydraulic control chamber; and a normally closed exhaust pressure valve interposed in a communicating passage between the hydraulic control chamber and an oil reservoir, said valve being opened upon receipt of an output signal from the sensor, wherein a hub of the wheel is formed with a pair of left and right end walls which are supported through bearings on a stationary axle which extends thorugh the end walls, the end walls and a body of the hub and said axle cooperating to define a closed chamber therebetween, said antilock controller is divided into a mechanical operating section including the sensor and a first transmission device of the transmission system which is adapted to operatively connect the flywheel of said sensor to the wheel and a hydraulically operating section including a hydraulic pump, a second transmission device of the transmission system which is adapted to operatively connect the pump to the wheel, the modulator and the exhaust pressure valve, and wherein said mechanical opearating section is encased in said closed chamber with the flywheel being supported on said axle, while said hydraulically operating section is mounted on a supporting system for the wheel externally of the closed chamber.

6. The brake device according to claim 5 wherin said hub includes a cylindrical shell shape, one of said pair of end walls is connected integral with said shell shape whereas the other is detachably secured to the shell shape.

7. The brake device according to claim 5 wherein said mechanical operating section is arranged on said axle in an approximately axially central portion thereof, and the flywheel in said mechanical operating section and the exhaust pressure valve in said hydraulically operating section are operatively connected with each other through a push rod axially slidably fitted in said axle.

8. A brake device for a vehicle provided with an antilock controller which comprises a sensor having a flywheel driven by a wheel through a transmission system, said sensor sensing a state of the wheel being about to lock by an overrunning rotation of the flywheel, during braking by a wheel brake, to generate an output signal; a hydraulic pressure pump driven by the wheel through the transmission system; a modulator having a hydraulic control chamber in communication with an outlet chamber of the pump and interposesd in a brake oil passage between a master cylinder and the wheel brake to decrease and restore a braking hydraulic presure of the wheel brake in response to a decrease and increase in pressure of the hydraulic control chamber; and a normally closed exhaust pressure valve interposed in a communicating passage between the hydraulic control chamber and an oil reservoir, said valve being opened upon receipt of an output signal from the sensor, wherein a hub of the wheel is formed with a pair of left and right end walls to define a closed chamber therebetween, both said end walls being supported through bearings on an axle which extends through the end walls, said antilock controller is divided into a mechanical operating section including the sensor and a first transmission device of the transmission system which is adapted to operatively connect the flywheel of said sensor to the wheel and a hydraulically operating section including a hydraulic pump, a second transmission device of the transmission system which is adapted to operatively connect the pump to the wheel, the modulator and the exhaust pressure valve, wherein said mechanical operating section is encased in said closed chamber with the flywheel being supported on said axle, while said hydraulically operating section is mounted on a supporting system for the wheel externally of the closed chamber, and wherein said first transmission device receives a rotational force of said wheel from one of said pair of end walls, and said second transmission device receives a rotational force of said wheel from the other end wall.

9. A brake device for a vehicle provided with an antilock controller which comprises a sensor having a flywheel driven by a wheel through a transmission system, said sensor sensing a state of the wheel being about to lock by an overrunning rotation of the flywheel, during braking by a wheel brake, to generate an output signal; a hydraulic pressure pump driven by the wheel through the transmission system; a modulator having a hydraulic control chamber in communication with an outlet chamber of the pump and interposed in a brake oil passage between a master cylinder and the wheel brake to decrease and restore a braking hydraulic pressure of the wheel brake in response to a decrease and increase in pressure of the hydraulic control chamber; and a normally closed exhaust pressure valve interposed in a communicating passage betweeen the hydraulic control chamber and an oil rservoir, said valve being opened upon receipt of an output signal from the sensor, wherein a hub of the wheel is formed with a pair of left and right end walls to define a closed chamber therebetween, both said end walls being supported through bearings on an axle which extends through the end walls, said antilock controller is divided into a mechanical operating section including the sensor and a first transmission device of the transmission system which is adapted to operatively connect the flywheel of said sensor to the wheel and a hydraulically operating section including a hydraulic pump, a second transmission device of the transmission system which is adapted to operatively connect the pump to the wheel, the modulator and the exhaust pressure valve, wherein said mechanical operating section is encased in said closed chamber with the flywheel being supported on said axle, while said hydraulically operating section is mounted on a supporting system for the wheel externally of the closed chamber, and wherein said first transmission device comprises a ring gear secured to one of said end walls, a planetray gear secured to said axle and meshed with said ring gear, and a sun gear rotatably provided on said axle and meshed with said planetary gear, and whereas said second transmission device comprises a ring gear secured to the other end wall and a pinion secured to a pump shaft of said hydraulic pump and meshed with the ring gear on the other end wall.

* * * * *